(12) United States Patent
Hojeij et al.

(10) Patent No.: US 11,296,852 B2
(45) Date of Patent: Apr. 5, 2022

(54) USER DISTRIBUTION TO SUB-BANDS IN MULTIPLE ACCESS COMMUNICATIONS SYSTEMS

(71) Applicants: INSTITUT MINES-TELECOM, Palaiseau (FR); UNIVERSITE LIBANAISE, Beirut (LB); UNIVERSITE SAINT-ESPRIT DE KASLIK, Jounieh (LB)

(72) Inventors: Marie-Rita Hojeij, Mont Liban (LB); Charbel Abdel Nour, Brest (FR); Joumana Farah, Mont Liban (LB); Catherine Douillard, Brest (FR)

(73) Assignees: INSTITUT MINES TELECOM, Palaiseau (FR); UNIVERSITE LIBANAISE, Beirut (LB); UNIVERSITE SAINT-ESPRIT DE KASLIK, Jounieh (LB)

( * ) Notice: Subject to any disclaimer, the term of this patent is extended or adjusted under 35 U.S.C. 154(b) by 16 days.

(21) Appl. No.: 17/042,478

(22) PCT Filed: Mar. 20, 2019

(86) PCT No.: PCT/EP2019/057004
§ 371 (c)(1),
(2) Date: Sep. 28, 2020

(87) PCT Pub. No.: WO2019/185428
PCT Pub. Date: Oct. 3, 2019

(65) Prior Publication Data
US 2021/0021396 A1 Jan. 21, 2021

(30) Foreign Application Priority Data
Mar. 28, 2018 (EP) ..................................... 18305353

(51) Int. Cl.
*H04L 5/00* (2006.01)

(52) U.S. Cl.
CPC .......... *H04L 5/0075* (2013.01); *H04L 5/0001* (2013.01); *H04L 5/0071* (2013.01)

(58) Field of Classification Search
CPC ... H04L 5/0075; H04L 5/0001; H04L 5/0071; H04L 5/003; H04W 72/0453; H04W 72/0446
See application file for complete search history.

(56) References Cited

U.S. PATENT DOCUMENTS

2015/0282185 A1 10/2015 Nikopour et al.
2017/0251517 A1* 8/2017 Kimura ............. H04W 72/0453
(Continued)

OTHER PUBLICATIONS

Tse, et al., "Fundamentals of Wireless Communication", Cambridge University Press, pp. 267-285, 2005.
(Continued)

*Primary Examiner* — Shukri Taha
(74) *Attorney, Agent, or Firm* — BakerHostetler

(57) ABSTRACT

A method of determining a performance metric for a selection of a first user and a second user among a set of candidate users for attribution to a sub-band in a multiple access communications system based on Non-Orthogonal Multiple Access (NOMA), is provided wherein the first user ($k_1$) and the second user ($k_2$) are selected as the pair of candidate users corresponding to an extremum of the ratio between a first term reflecting the total throughput achievable by any pair of the candidate users assigned to the sub-band (s) under consideration, and a second term reflecting the known throughput achieved by that same pair of candidate users over a predetermined preceding period. Implementations include a method of determining a performance metric is presented for attributing users to one or more of a plurality of sub-bands in a multiple access communications system, wherein in an initial assignment phase for a specific subband, a first user is selected for that band on the basis of one
(Continued)

or more criteria such as user priority. Then a second sub-band user maximizing or minimizing the performance metric.

12 Claims, 6 Drawing Sheets

(56) References Cited

U.S. PATENT DOCUMENTS

2019/0059098 A1* 2/2019 Zhang .................. H04L 5/0091
2019/0199497 A1* 6/2019 Park ..................... H04B 7/0456

OTHER PUBLICATIONS

Endo, et al., "Uplink Non-orthogonal Access with MMSE-SIC in the Presence of Inter-cell Interference", Proc. 2012 IEEE Int. Symp. on. Wireless Commun. Syst, 2012.
Saito, et al., "System-level performance evaluation of downlink non-orthogonal multiple access (NOMA)", 2013 IEEE 24th Annual International Symposium on Personal, Indoor, and Mobile Radio Communications (PIMRC), 2013.
Umehara, et al., "Enhancing user fairness in non-orthogonal access with successive interference cancellation for cellular downlink", Proc. International Conference on Communication Systems (ICCS 2012).
Mehrjoo, et al., "Design of Fair Weights for Heterogeneous Traffic Scheduling in Multichannel Wireless Networks", IEEE Trans. Commun., 58(10), (2010).
Gueguen, "Compensated Proportional Fair Scheduling in Multiuser OFDM Wireless Networks", Proc. IEEE International conference on Wireless Mobile Computing, Networking Communication, (2008).
Yang, C., "A Weighted Proportional Fair Scheduling to Maximize Best-Effort Service Utility in Multicell Network", Proc. IEEE International Symposium on Personal, Indoor and Mobile Radio Communications, (2008).
Saito, et al., "System-Level Performance of Downlink Non-Orthogonal Multiple Access (NOMA) under Various Environments", 2015 IEEE 81st Vehicular Technology Conference (VTC Spring), pp. 1-5, May 11, 2015.

* cited by examiner

USER DISTRIBUTION TO SUB-BANDS IN MULTIPLE ACCESS COMMUNICATIONS SYSTEMS

CROSS-REFERENCE TO RELATED APPLICATIONS

This application is a National Stage of International patent application PCT/EP2019/057004, filed on Mar. 20, 2019, which claims priority to foreign European patent application No. EP 18305353.7, filed on Mar. 28, 2018, the disclosures of which are incorporated by reference in their entirety.

FIELD OF THE INVENTION

The present invention relates to user distribution to sub-bands in multiple access communications system such as Orthogonal Multiple Access (OMA) and Non-Orthogonal Multiple Access (NOMA).

BACKGROUND OF THE INVENTION

With the proliferation of internet applications, it is expected that the mobile traffic volume supported by communication networks increases by 8 times between the end of 2016 and 2022. To respond favourably to such constraints while keeping a high level of user quality of experience, system capacity and user fairness should be largely improved for the future 5th generation (5G) mobile communication systems. To this end, Non-Orthogonal Multiple Access (NOMA) has recently emerged as a promising candidate for future radio access.

By exploiting an additional multiplexing domain, the power domain, NOMA allows the cohabitation of multiple users per sub-band at the transmitter side, on top of the modulation layer which may be Orthogonal Frequency Division Multiplex (OFDM), Filter Bank Multi-Carrier (FBMC), Universal Filtered Multi-Carrier (UFMC), or other multiple carrier scheme, and relies on an interference cancellation technique at the receiver side, such as Successive Interference Cancellation (SIC).

An attractive feature of NOMA is that it targets the increase of system capacity while improving user fairness. Therefore, most of the prior art dealing with NOMA considers the proportional fairness (PF) scheduler as a multiuser scheduling scheme for the trade-off between total user throughput or data rate and the user fairness that it provides. Examples of power allocation algorithms, jointly implemented with a NOMA-based PF scheduler used for the selection of users to be assigned to each sub-band are presented for example in "Uplink non-orthogonal access with MMSE-SIC in the presence of inter-cell interference" by Y. Endo, Y. Kishiyama, and K. Higuchi. in proc. 2012 IEEE Int. Symp. on Wireless Commun. Syst, 2012, or "System-Level Performance of Downlink Non-orthogonal Multiple Access (NOMA) Under Various Environments" by Y. Saito, A. Benjebbour, Y. Kishiyama, and T. Nakamura in proc. IEEE 81st VTC, 2015.

The operation of the PF scheduler is as follows: at the beginning of each scheduling slot t, each user provides the base station (BS) with its channel state. The BS can then compute the achievable throughput for each user (depending on the adopted power allocation strategy). The PF scheduler (operating at the BS side) keeps track of the average throughput achieved by each user in a past window of length tc and gives each user a priority inversely proportional to its average throughput.

In the article by Umehara, J., Kishiyama, Y., Higuchi, K. entitled "Enhancing user fairness in non-orthogonal access with successive interference cancellation for cellular downlink", in Proc. International Conference on Communication Systems (ICCS 2012), the authors propose a weighted PF-based multiuser scheduling scheme in a non-orthogonal access downlink system. A frequency block access policy is proposed for cell-interior and cell-edge user groups in fractional frequency reuse (FFR), with significant improvements in the user fairness and system frequency efficiency.

In the article by Mehrjoo, M., Awad, M. K., Dianati, M., Xuemin, S., entitled "Design of Fair Weights for Heterogeneous Traffic Scheduling in Multichannel Wireless Networks," IEEE Trans. Commun., 58(10) (2010), fair weights have been implemented for opportunistic scheduling of heterogeneous traffic types for OFDMA networks. For designing fair weights, the proposed scheduler takes into account average channel status and resource requirements in terms of traffic types. Simulation analysis demonstrates the efficiency of the proposed scheme in terms of resource utilization, and flexibility to network characteristics change due to user mobility.

In the article from Gueguen, C., Baey, S., entitled "Compensated Proportional Fair Scheduling in Multiuser OFDM Wireless Networks", in Proc. IEEE International conference on Wireless Mobile Computing, Networking Communication (2008), the problem of fairness deficiency encountered by the PF scheduler when the mobiles experience unequal path loss is investigated. To mitigate this issue, a modified version of the PF scheduler that introduces distance compensation factors has been proposed. It was shown that this solution achieves both high capacity and high fairness. In the article by Yang, C., Wang, W., Qian, Y., Zhang X., entitled "A Weighted Proportional Fair Scheduling to Maximize Best-Effort Service Utility in Multicell Network, in Proc. IEEE International Symposium on Personal, Indoor and Mobile Radio Communications (2008), a weighted proportional fair algorithm is proposed in order to maximize best-effort service utility. The reason behind introducing weight factors to the PF metric is to exploit the inherent near-far diversity given by the path loss. The proposed algorithm enhances both best-effort service utility and throughput performance while maintaining similar complexity when compared to the PF metric.

Since the scheduler in NOMA may allocate a sub-band to more than one user simultaneously, the user scheduling policy affects system efficiency and user fairness. The "Proportional Fairness" (PF) scheduler as introduced by the prior art references above is considered to achieve a trade-off between these two metrics. The objective of the PF scheduler is to maximize the long term averaged user rates, in order to ensure balance between cell throughput and user fairness. The PF algorithm is used in LTE (Long Term Evolution) for user scheduling (assignment of users to time-frequency resource blocks).

The PF scheduling algorithm was initially devised for orthogonal multiple access schemes (OFDMA in LTE) but was later adapted for Non-Orthogonal Multiple Access (NOMA) schemes. This scheduling policy has been adopted in the majority of proposed NOMA implementations.

If a downlink system with a single transmitter and receiver antenna is considered, the system consists of K users per cell, with a total system bandwidth B divided into S sub-bands, and a maximum allowable transmit power Pmax by the Base Station. Among the K users, a set of users Us={k1, k2, ..., kn, ..., kN}, is selected to be scheduled over each frequency sub-band s, ($1 \leq s \leq S$). N indicates the number of users non-orthogonally scheduled on a sub-band. The Successive Interference Canceller (SIC) process as described in Fundamentals of Wireless Communication, Cambridge University Press, 2005 by D. Tse, and P. Viswanath, is conducted at the receiver side, and the optimum order for user decoding is in the increasing order of the squared channel gains observed by users, normalized by the noise and inter-cell interference $$\frac{h_{s,k_n}^2}{n_{s,k_n}}$$

where $h_{s,k_n}$ is the equivalent channel gain at sub-band s, between user kn and the base station BS, and $n_{s,k_n}$ the average power of the Gaussian noise plus intercell interference received by user $k_n$. Assuming successful decoding and no SIC error propagation, and supposing that inter-cell interference is randomized such that it can be considered as white noise, the throughput of user $k_n$, at sub-band s, $R_{s,k_n}$, is given by:

$$R_{s,k_n} = \frac{B}{S}\log_2\left(1 + \frac{h_{s,k_n}^2 P_{s,k_n}}{\sum_{k_j \in U^s, \frac{h_{s,k_n}^2}{n_{s,k_n}} < \frac{h_{s,k_j}^2}{n_{s,k_{nj}}}} h_{s,k_j}^2 P_{s,k_j} + n_{s,k_n}}\right) \quad \text{Eq. (1)}$$

Where

K is the number of users per cell,

B is the total system bandwidth, $k_n$ is a user n of K,

N is the number of users non-orthogonally scheduled on a sub-band, $U^s = \{k_1, k_2, \ldots, k_n, \ldots, k_N\}$, is the set of users selected to be scheduled over each frequency sub-band, $k_j$ considers the users of $U^s$ having a channel gain greater than $k_n$, S is the number of sub-bands in the system, s is the sub band under consideration (1≤s≤S), $P_{max}$ is the maximum allowable transmit power, $$\frac{h_{s,k_n}^2}{n_{s,k_n}}$$

is the squared channel gain observed by user $k_n$, normalized by the noise and inter-cell interference where $h_{s,k_n}$ is the equivalent channel gain at sub-band s, between user $k_n$ and the base station BS, and $$n_{s,k_n}$$

the average power of the Gaussian noise plus intercell interference received by $k_n$, at sub-band s, and $R_{s,k}(t)$ represents the throughput of user k on sub-band s.

The transmit power allocation constraint is represented by $$\sum_{s=1}^{S} P_s = P_{max}, \text{ with } P_s = \sum_{n=1}^{N} P_{s,k_n} \quad \text{Eq. (2)}$$

Where $P_s$ denotes the amount of allocated power on sub-band s.

When only one user is assigned to each frequency sub-band (orthogonal multiple access case), the operation of the PF scheduler is as follows: at the beginning of each scheduling slot t, each user k provides the base station with its channel gain on each sub-band s, s=1 . . . S. The time slot is the elementary time allocation unit in the communication system. For instance, in LTE (acronym for Long Term Evolution, a 4th generation wireless broadband technology developed by the 3rd Generation Partnership Project, 3GPP) systems, it is equal to 1 ms.

The base station computes the corresponding achievable throughput for user k on sub-band s, Rs,k(t).

At a time slot t, user k* is selected to be served on sub-band s based on:

$$k^* = \underset{k=1 \ldots K}{\operatorname{argmax}} \frac{R_{s,k}(t)}{T_k(t)} \quad \text{Eq. (3)}$$

The scheduling algorithm keeps track of the average throughput Tk(t) of each user in a past window of length tc, where tc defines the throughput averaging time window (over a specified number of previous time slots). Tk(t) is defined as:

$$T_k(t+1) = \left(1 - \frac{1}{t_c}\right)T_k(t) + \frac{1}{t_c}\sum_{s=1}^{S} R_{s,k}(t) \quad \text{Eq. (4)}$$

where $R_{s,k}(t)$ represents the throughput of user k on sub-band s, at time instance t. It is calculated based on Eq. (1) above, and can equal zero if user k is not scheduled on sub-band s.

A scheduler applying this approach gives each user a priority inversely proportional to its average throughput Tk(t). If Tk(t) is high, user k will possibly not be assigned any transmission rate for several time slots. This is problematic for applications requiring quasi-constant Quality of Experience (QoE), and may call for deep buffering. By the same token, this approach may raise difficulties for applications requiring low latency transmission.

In the case of NOMA, where N>1, the possible candidate user sets are enumerated $$C = \binom{K}{N}$$

combinations U of N users among K. At the beginning of each scheduling time slot t each user k provides the base station with its channel gain on each sub-band s, s=1 . . . S. For each candidate user set U (U∈{U₁, . . . , $U_C$}) on sub-band s, the base station computes the corresponding throughput for user k in set U, $R_{s,k|U}(t)$. At time t, the selected user set is $$U^s = \underset{U \in \{U_1 \ldots U_C\}}{\operatorname{argmax}} \sum_{k \in U} \frac{R_{s,k|U}(T)}{T_k(T)} \qquad \text{Eq. (5)}$$

Where $R_{s,k|U}(t)$ is the achievable throughput of user k on sub-band s at time t, considering user set U, $T_k(t)$ is the average throughput of user k in a past window of length $t_c$, considering all the sub-bands and assuming the available frequency band B is divided into S sub-bands, the total number of users willing to communicate is K, the number of users on sub-band s is N (in OMA N=1, in NOMA N>1), and the total power budget is $P_{max}$. At the beginning of the scheduling process, all the users have throughput equal to 0, and at the beginning of each scheduling time slot t, each user k provides the base station with its channel gain on each sub-band s, with s=1 ... S, $h_{s,k}(t)$, and the average throughput $T_k(t)$ of user k is computed for a past window of length tc, considering all the sub-bands.

The PF scheduler targets long-term fairness. Since the PF scheduler gives each user a priority inversely proportional to its average throughput, it happens that some users do not gain access to available resources whenever their average throughput is high. In such a case, the users will not be assigned any transmission rate for multiple scheduling slots. This behaviour can be very problematic in applications with constraints on user throughput (e.g. quasi-constant data rate applications), or where deep buffering may be needed, and may not be compatible with applications requiring low latency transmission. Moreover, for NOMA schemes, the PF scheduler does not take account of a specificity of NOMA: the overall throughput achieved in NOMA systems increases with the difference in channel gains of paired users.

US2015282185 purports de describe a multi-access communication system having a plurality of multiplexed layers and a plurality of mobile devices in which mobile devices are paired over time-frequency and space resources. Transmission power is allocated such that a total power is shared among the plurality of multiplexed layers. The plurality of multiplexed layers and rate of each of the plurality of mobile devices are adjusted according to a power and a channel quality of the mobile device. Power and rate are adjusted until a scheduling criterion such as a weighted sum-rate is maximized.

The article entitled "System-Level Performance of Downlink Non-orthogonal Multiple Access (Noma) Under Various Environments" by Yuya Saito et al, published in 2015 IEEE 81s Vehicular Technology Conference (VTC Spring), IEEE, 11 May 2015, Pages 1 to 5, describes characteristic behaviours in NOMA systems using proportional fairness based selection mechanisms.

In general, when using PF scheduling for user allocation in NOMA schemes, a large user throughput gain can be observed for users located near the base station compared to orthogonal multiple access (OMA) schemes (also referred to as Orthogonal Signaling (OS)), but almost no gain is achieved for cell edge users.

It is thus desirable to identify a mechanism for resolving these issues and providing a method for a better attribution of users.

SUMMARY OF THE INVENTION

There is a need to attribute users to sub-bands in NOMA systems while achieving a trade-off between total user throughput or data rate and long-term user fairness.

To this effect, the invention discloses in a first aspect a system for attributing users to one or more of a plurality of sub-bands in a multiple access communications system based on Non-Orthogonal Multiple Access (NOMA). The system comprise an assignment processor adapted to determine for a respective selected sub-band a plurality of candidate pairs of users for possible assignment to the selected sub-band, each candidate pair of users comprising two different users including a first user and a candidate second user, and a throughput calculator adapted to determine the pair of candidate users maximizing a metric reflecting the total throughput achievable by any pair of users assigned to the sub-band (s) under consideration, as a proportion of the known throughput achieved by that same pair of users over a predetermined preceding period. The assignment processor being further adapted to assign pair of candidate users determined by the throughput calculator to maximize the metric to the sub-band (s) under consideration.

In accordance with the present invention in a second aspect there is provided a method of determining a performance metric for a selection of a first user ($k_1$) and a second user ($k_2$) among a set of candidate users for attribution to a sub-band (s) in a multiple access communications system based on Non-Orthogonal Multiple Access (NOMA), wherein the first user ($k_1$) and the second user ($k_2$) are selected as the pair of candidate users corresponding to an extremum of the ratio between a first term reflecting the total throughput achievable by any pair of candidate users assigned to the sub-band (s) under consideration, and a second term reflecting the known throughput achieved by that same pair of candidate users over a predetermined preceding period.

In a development of the second aspect, the method comprises the further steps of selecting a first user ($k_1$) based on at least one criterion. A respective first term representing the sum of the achievable throughput value for the selected first user ($k_1$) on the sub-band (s) when paired with the respective candidate user (k) is calculated for each candidate pair of users comprising the first user ($k_1$) and a respective candidate second user (k) and the achievable throughput value for the respective candidate user (k) on the sub-band (s) when paired with the selected first user ($k_1$). A respective second term representing the cumulated known throughput of the selected first user ($k_1$) and the candidate user (k), is calculated for each candidate user (k) among all candidate sub-band users excluding the selected first user ($k_1$), by the sum of the known throughput value for the selected first user ($k_1$) across all sub-bands during an assessment time window, and the known throughput value for the second candidate user (k) across all sub-bands during the assessment time window. A second user ($k_2$), is selected, wherein the selected first user ($k_1$) and the selected second user ($k_2$) form the pair of candidate users corresponding to an extremum of the ratio between the respective first term and the respective second term.

In accordance with a further development of the second aspect, the steps of selecting a first user ($k_1$) are repeated so as to select each of the candidate users as the first user in turn, and the steps of calculating the first term and calculating the second term for each candidate user (k) of the set of candidate users excluding the selected first user ($k_1$) is repeated before proceeding to the step of selecting the pair of candidate users.

In accordance with a further development of the second aspect, the method comprises the further step of attributing the sub-band (s) to the selected first user ($k_1$) paired with the selected second user ($k_2$).

In accordance with a further development of the second aspect, the second term represents a weighted cumulated known throughput of the candidate second user (k) and the selected first user ($k_1$), wherein the know throughput value for the second candidate user (k) across all sub-bands during the assessment time window is weighted by a first weighting parameter (a), and the known throughput value for the selected first user ($k_1$) across all sub-bands during the assessment time window is weighted by a second weighting parameter (b), the first weighting parameter (a) and the second weighting parameter (b) having respective values between 0 inclusive and 1 inclusive.

In accordance with a further development of the second aspect, the value of the first weighting parameter (a) is set to 0, thereby maximizing the NOMA throughput on the sub-band (s).

In accordance with a further development of the second aspect, the value of the second weighting parameter (b) is set to 0, thereby achieving a balance between fairness for the selected second sub-band user ($k_2$) and NOMA throughput on the sub-band (s).

In accordance with a further development of the second aspect, the value of the first weighting parameter (a) and the value of the second weighting parameter (b) are both not null, thereby reducing the impact of the known throughput of the second user ($k_2$).

In accordance with a further development of the second aspect, the known throughput of a user (k) takes account of the projected throughput for the user (k) and the average throughput during the assessment time window, wherein the projected throughput is the sum of the achievable throughputs for the user (k) on each sub-band to which the user (k) has been attributed in the current time slot.

In accordance with a further development of the second aspect, at the step of calculating for each candidate sub-band user (k) among all candidate sub-band users excluding the selected first sub-band user ($k_1$) a respective second term comprises:
- calculating for each user (k') the known throughput of the user (k') during the assessment time window taking account of the projected throughput for user (k') at the time of the step of calculating a respective second term,
- calculating the average value of the known throughput computed over all candidate sub-band users,
- the respective second term being the sum over each user (k') among all candidate sub-band users the absolute value of the difference between the known throughput of the user (k') taking account of the projected throughput for user (k') and the average value of the known throughput computed over all candidate sub-band users.

In accordance with the present invention in a third aspect there is provided an apparatus adapted to implement the steps of the second aspect.

In accordance with the present invention in a fourth aspect there is provided a computer program comprising instructions which, when the program is executed by a computer, cause the computer to carry out the steps of the second aspect.

In accordance with the present invention in a fourth aspect there is provided a computer readable medium incorporating the computer program of fourth aspect.

BRIEF DESCRIPTION OF THE DRAWINGS

The above and other advantages of the present invention will now be described with reference to the accompanying drawings, for illustration purposes only, in which.

DETAILED DESCRIPTION

Figure 1:
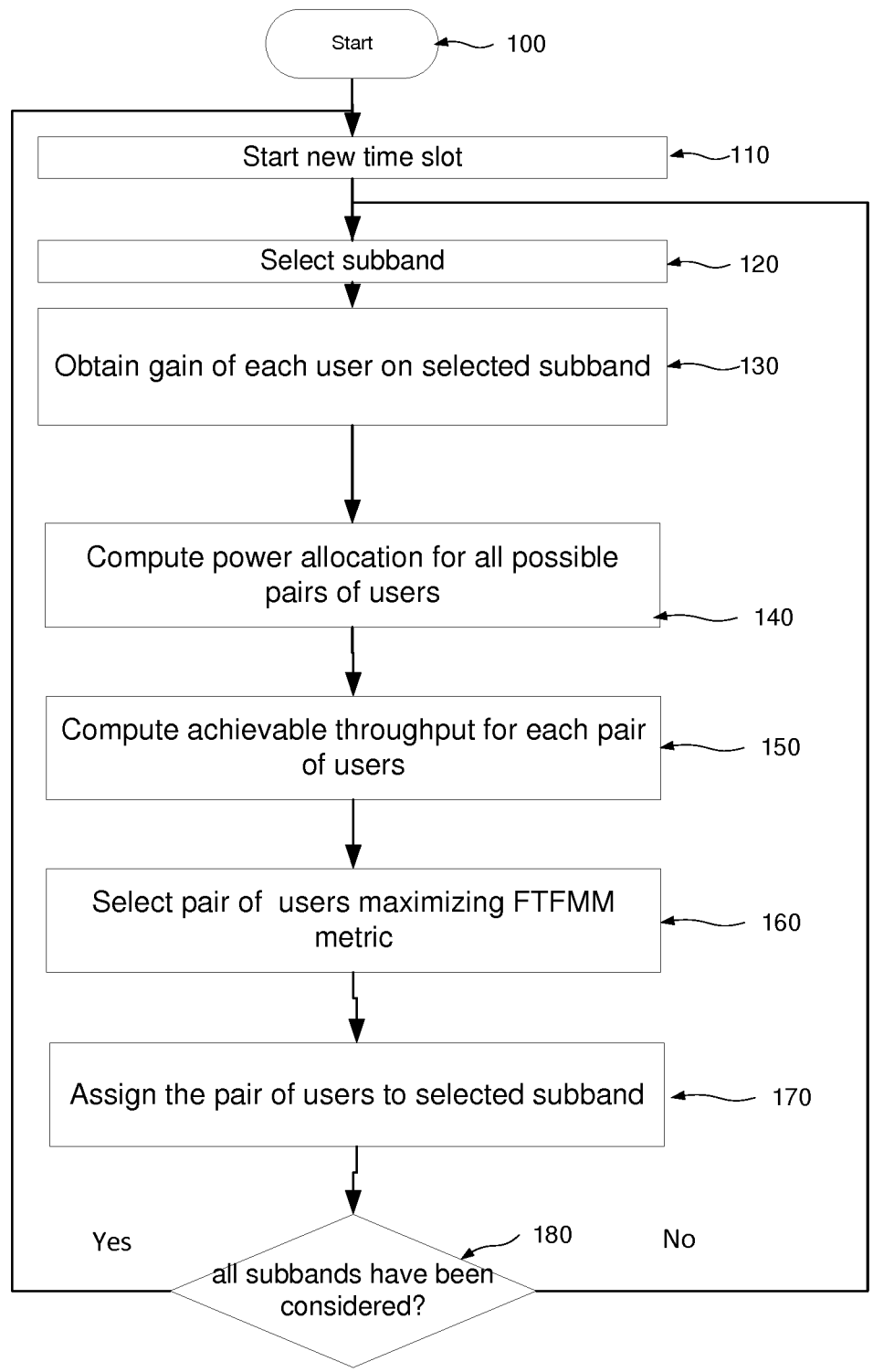
FIG. 1 displays an operating procedure of a first exemplary selection mechanism.

In order to further improve the achieved system performance in NOMA, the present invention aims to optimally distributing users among sub-bands. This may lead to improved user fairness and/or increase the achieved system throughput.

Embodiments of the present invention provide an improved metric for user distribution to sub-bands in NOMA systems. The invention will be described hereinafter with reference to embodiments of the invention for illustration purpose.

The invention discloses a method of determining a performance metric for a selection of a first sub-band user $k_1$ and of a second sub-band user $k_2$ among a set of candidate sub-band users for attribution to a sub-band s in a multiple access communications system based on Non-Orthogonal Multiple Access (NOMA), wherein the first sub-band user $k_1$ and the second sub-band user $k_2$ are selected as the pair of candidate users maximizing a metric reflecting the total throughput achievable by any pair of users assigned to the sub-band (s) under consideration, as a proportion of the average throughput achieved by that same pair of users over a predetermined preceding period. The set of candidate users may comprise all users that are assignable to the sub-band, or may be a reduced set subject to preselection depending on the implementation details.

Such an approach may be implemented in a wide range of algorithms. In some cases a first user may be preselected, and then a second user assigned as the user forming the pair of candidate users maximizing the metric together with the first user, and in other cases a plurality of candidate first users may be considered together with respective second users. Examples of both approaches are set out in the following examples.

In some embodiments, the first user $k_1$ may be preselected according to at least one criterion, such as but not limited to, prioritizing demanding users which have applications needing for example high quality of experience, prioritizing users furthest from a Base Station, prioritizing users with weak channel state information (CSI) and/or prioritizing users that haven't been allocated to a sub-band since longer time. The "worst best h" criterion may be used, whereby the channel gain h of all users on all sub-bands is computed, and only the best h value for each user retained, and the user with the lowest best h selected. The selected user has low channel gain and is probably far from the BS. Users using applications requiring more data rate than the others (independently of the required Quality of Experience (QoE) for these users) may be prioritized, as may users having subscribed to premium services or, for the cases where the users have target data rates, the users whose average achieved data rate is far from the target.

The invention may be adapted to many user selection mechanisms, of which three are presented below by way of examples. However, the skilled person will appreciate that the claimed approach may be adapted to many other such selection mechanisms.

FIG. 1 displays an operating procedure of a first exemplary selection mechanism. Access is granted following allocation of resources in time and frequency. Allocation is divided into a number of time slots. For each time slot, sub-bands are allocated sequentially until the total number of sub-bands per time slot is reached. For each sub-band allocation, all combinations of users are considered.

The method starts at step 100 before proceeding to step 110 at which a new time slot begins. The method next proceeds to step 120 at which a sub-band s is selected among the set of available sub-bands. In accordance with the present embodiment, this selection is simply a sequential selection by increasing or decreasing order of frequency. The sub-band might also be chosen at random in the set of available sub-bands but, in this case, the selected sub-band may be removed from the set of sub-band before the next random selection. Once a sub-band is selected the method proceeds to step 130 at which each user k among the K users willing to communicate provides the base station with its channel gain on sub-band s. The method next proceeds to step 140 at which power is allocated to the sub-bands, and amongst users within a sub-band. Power allocations have implications for throughput values. In the present example it may be assumed that power is distributed equally amongst sub-bands, however there are many alternative approaches of allocation of power to sub-bands (such as water filling). There are also several approaches to distribute the power amongst the users of a sub-band s (intra-sub-band power allocation, for example Fixed Power Allocation (FPA), Fractional Transmit Power Allocation (FTPA)), all of which are compatible with and encompassed in the present disclosure.

In the present embodiment, computation of power allocation is performed before throughput computation because the throughput value for a user depends on the power allocated to this user.

The method next proceeds to step 150 at which the base station computes the corresponding achievable throughputs for all candidate sets of N user s (pairs of users for N=2) on selected sub-band s.

The method next proceeds to step 160 at which the base station selects a set of N users based on at least one criterion.

Case N=2 (pairs of users): the pair of users $(k_1, k_2)$ is selected that maximizes the metric:

$$(k_1, k_2) = \underset{(k,k') \in S_2}{\mathrm{argmax}} \frac{R_{s,k}(t) + R_{s,k'}(t)}{R_{k,tot}(t) + R_{k',tot}(t)} \quad \text{Eq. (6)}$$

where
$S_2$ denotes the set of candidate pairs of users.
$R_{s,k}(t)$ (and respectively $R_{s,k'}(t)$) is the achievable throughput for a candidate first user k (respectively a candidate second user k') on sub-band s, when paired with k' (respectively with k).
$R_{k,tot}(t)$ (and respectively $R_{k',tot}(t)$) is the known throughput for the candidate first user k (respectively for the candidate second user k'). It can be taken equal to:

$R_{k,tot}(t) = T_k(t)$ (for the candidate first user k)

$R_{k',tot}(t) = T_{k'}(t)$ (for the candidate second user k'). Eq. (7)

where
$T_k(t)$ (and respectively $T_{k'}(t)$) is the average throughput of user k (respectively user k') in the past window of length tc, with tc being a dimensionless value, defining a number of time slots, The metric presented by Eq. (6) is hereafter called "Flexible Throughput vs Fairness Maximisation Metric" and noted by its abbreviation (FTFMM).

At step 170 the selected users $k_1$ and $k_2$ are assigned to the selected sub-band s, and at step 180 the method determines whether all sub-bands have been considered, and in a case where sub-bands remain to be allocated users in the present time slot, the method loops back to step 120 and continues to iterate for further sub-bands. In a case where no sub-bands remain to be allocated users in the present time slot, the method loops back to Step 110.

It will be appreciated that FIG. 1 shows a straightforward method for selecting jointly a pair or a tuple (if N>2) of users to be assigned to a selected sub-band s. This approach may preclude the selection of users according to another criterion besides the tradeoff between total user throughput and user fairness (e.g. giving priority to some users who have subscribed to premium services or who need a high quality of service or whatever).

Accordingly, as described there is provided a method of determining a performance metric for a selection of a first user ($k_1$) and a second user ($k_2$) among a set of candidate users for attribution to a sub-band (s) in a multiple access communications system based on Non-Orthogonal Multiple Access (NOMA), wherein the first user ($k_1$) and the second user ($k_2$) are selected as the pair of candidate users corresponding to an extremum of the ratio between a first term reflecting the total throughput achievable by any pair of candidate users assigned to the sub-band (s) under consideration, and a second term reflecting the known throughput achieved by that same pair of candidate users over a predetermined preceding period.

The maximization of the metric of Eq. (6) tends to favour the pair of users with a high NOMA throughput and/or with a low known throughput. Thus the numerator portion represents the NOMA throughput on sub-band s with a given pair of users, and the denominator represents a weighted cumulated known throughput of those same users.

In an optional variant, the known throughput of a user k, $R_{k,tot}(t)$, may optionally take account of the projected throughput for the user k, $R_k(t)$, and the average throughput $T_k(t)$ during the assessment time window $t_c$.

$$R_{k,tot}(t) = \left(1 - \frac{1}{t_c}\right)T_k(t) + \frac{R_k(t)}{t_c} \quad \text{Eq. (8)}$$

This term can be seen as an updated value of $T_k(t)$ taking into account the throughput already allocated to user k at the current time slot t (projected throughput). When all the sub-bands have been allocated at time slot t, $R_{k,tot}(t)$ is equal to $T_k(t+1)$ (see Eq. 4). $R_{k,tot}(t)$ is an intermediate value between $T_k(t)$ and $T_k(t+1)$.

The projected throughput $R_k(t)$ is the sum of the achievable throughputs for the user k on each sub-band, $R_{s,k}(t)$, to which the user k has been attributed in the current time slot t.

On this basis the second term reflecting the known throughput achieved by that same pair of candidate users over a predetermined preceding period may comprise the sum of the known throughput of the candidate sub-band first user k taking into account the projected throughput for that user assigned in the current time slot, and the known throughput of the candidate sub-band second user k' taking into account the projected throughput for that user assigned in the current time slot.

Experimental results show that the performance of the FTFMM metric may be better when the known throughput of a user k, $R_{k,tot}(t)$, takes account of the projected throughput for the user k, $R_k(t)$, for the current time window in addition to the average throughput $T_k(t)$ during the assessment time window $t_c$. This improvement is due to the fact that we have a more accurate value of the known throughput $T_k(t)$ when we take account of the projected throughput. The improvement is more significant when the window length is short. If it is very long, including or not the projected throughput in the computation of the known throughput value does not make any difference.

In a further optional variant, in the case of the basic selection mechanism described above with respect to the prior art of N among K users in NOMA systems where N>2, the user set to be selected $U^S$ among the possible candidate user sets is the set of users $(k_1, k_2, \ldots, k_N)$ which maximizes the metric:

$$U^S = \underset{(k^1,\ldots,k^N) \in S_N}{\text{Argmax}} \frac{\sum_{i=1}^{N} R_{s,k^i}(t)}{\sum_{i=1}^{N} R_{k^i,tot}(t)} \quad \text{Eq. (9)}$$

where
- $S_N$ denotes the set of candidate tuples of users,
- $R_{s,k^i}(t)$ is the achievable throughput for a candidate user $k^i$ on sub-band s, when associated with the other candidate users $k^j$, $j=1 \ldots N$, $j \neq i$.
- $R_{k^j,tot}(t)$ is the known throughput, corresponding to the average throughput for the candidate user $k^i$ in a past window of length $t_c$.

$$R_{k^j,tot}(t) = T_{k^i}(t)$$

Or optionally, in a case where projected throughputs are taken into account, $$R_{k,tot}(t) = \left(1 - \frac{1}{t_c}\right) T_k(t) + \frac{R_k(t)}{t_c}$$

As such, as a variant of the method of FIG. 1 at step 170 the selected users $k_1$ and $k_2$ ($(k_1, k_2, \ldots, k_N)$ if N>2) may be assigned to the selected sub-band s.

Figure 2:
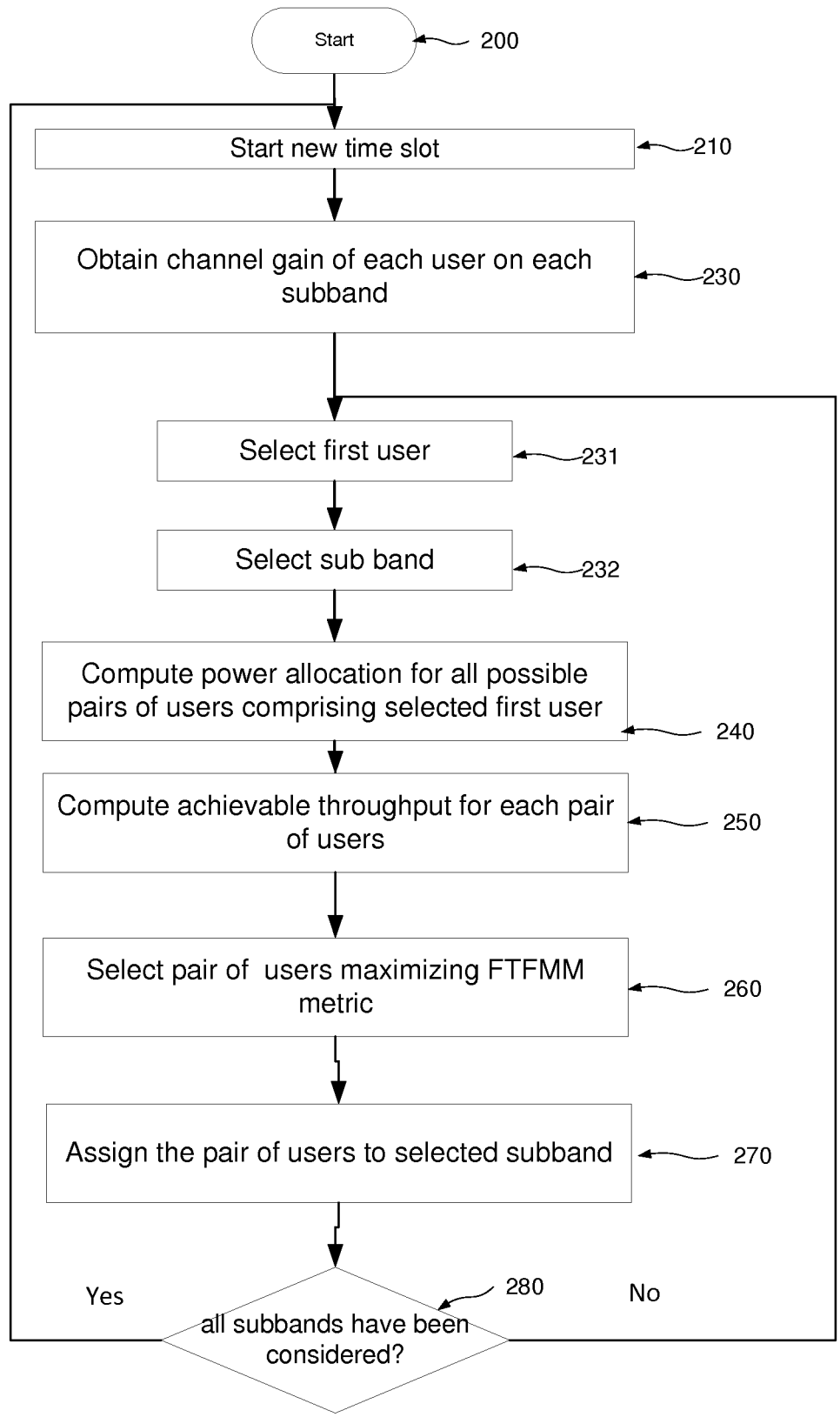
FIG. 2 shows an embodiment in which candidate second user for association with a preselected first user are considered.

FIG. 2 shows an embodiment in which candidate second user for association with a preselected first user are considered.

The method starts at step 200 before proceeding to step 210 at which a new time slot begins. The method next proceeds to step 230 at which each user k among the K users willing to communicate provides the base station with its channel gain on sub-band s. The method next proceeds to step 231 at which a first user is selected. The first user may be selected on the basis of any suitable criterion such as but not limited to, prioritizing demanding users which have applications needing for example high quality of experience, prioritizing users furthest from a Base Station, prioritizing users with weak channel state information (CSI) and/or prioritizing users that haven't been allocated to a sub-band since longer time. The "worst best h" criterion may be used, whereby the channel gain h of all users on all sub-bands is computed, and only the best h value for each user retained, and the user with the lowest best h selected. The selected user has low channel gain and is probably far from the base station. Users using applications requiring more data rate than the others (independently of the required QoE for these users) may be prioritized, as may users having subscribed to premium services or, for the cases where the users have target data rates, the users whose known throughput or data rate is far from the target. Any combination of these factors may be combined as the basis of the selection of the first user. Once the first user ($k_1$) has been selected, the method proceeds to step 232 at which a sub-band s is selected among the set of available sub-bands. In accordance with the present embodiment this selection is simply a sequential selection by increasing or decreasing order of frequency. The sub-band might also be chosen at random in the set of available sub-bands but, in this case, the selected sub-band may be removed from the set of sub-band before the next random selection. Once a sub-band is selected the method proceeds to step at which power is allocated to the selected sub-band s, and amongst the selected first user and the candidate second users (or the other candidates users for N>2). Power may be assigned using any of the mechanisms described above with reference to FIG. 1. The method then proceeds to step 250 at which the achievable throughput is calculated for each pair of users. At step 260 a second user $k_2$ is selected that maximizes the metric:

$$k_2 = \underset{k \in S_2}{\text{Argmax}} \frac{R_{s,k}(t) + R_{s,k_1}(t)}{R_{k,tot}(t) + R_{k_1,tot}(t)} \quad \text{Eq. (10)}$$

where
$S_2$ denotes the set of candidate second users.
Case N>2: the set of users $(k_2, \ldots, k_N)$ is selected that maximizes the metric:

$$(k_2, \ldots, k_N) = \underset{(k^2,\ldots,k^N) \in S_N}{\text{Argmax}} \frac{R_{s,k_1}(t) + \sum_{i=2}^{N} R_{s,k^i}(t)}{R_{k_1,tot}(t) + \sum_{i=2}^{N} R_{k^i,tot}(t)} \quad \text{Eq. (11)}$$

where
$S_N$ denotes the set of candidate (N−1)-tuple users.
At step 270 the selected users $k_1$ and $k_2$ are assigned to the selected sub-band s, and at step 280, the method determines whether all sub-bands have been considered, and in a case where sub-bands remain to be allocated in the present time slot, the method loops back to step 231 and continues to iterate for further sub-bands. In a case where no sub-bands remain to be allocated users in the present time slot, the method loops back to step 210.

It will be appreciated that in certain circumstances the steps 231 and 232 might be inverted, for example if the sub-bands are selected sequentially, in increasing/decreasing order of frequency or at random. If the sub-band is selected as the sub-band with the highest channel gain for the selected user 1, such an inversion may not be meaningful.

It will be appreciated that the methods of FIGS. 1 and 2 may be modified substantially without changing the underlying principle the FTFMM metric may be calculated for different users in parallel rather than in series. Certain redundant combinations of users may be disregarded (there may be no need to consider as first user a user who has already be considered as second user with the same candidate partner). Users may be assigned to respective sub-bands in parallel. The assignment of users need not constitute a discrete step, and may be implied by the determination of the selection of a user maximising the FTFMM metric. Gain values may alternatively be obtained as and when a user is considered under the FTFMM metric.

In some embodiments, a variant of the FTFMM metric, that may be called as "weighted FTFMM", expressed by Eq. (6) may be used as follows:

$$(k_1, k_2) = \underset{(k,k') \in S_2}{\text{Argmax}} \frac{R_{s,k}(t) + R_{s,k'}(t)}{aR_{k',tot}(t) + bR_{k,tot}(t)} \quad \text{Eq. (12)}$$

in which optional parameters a and b may take values between 0 inclusive and 1 inclusive where a and b are not null simultaneously. The introduction of parameters a and b provides a mechanism for varying the relative importance of fairness on one hand and throughput on the other.

In other words, in such embodiments the second term (denominator) represents a weighted cumulated known throughput of the candidate sub-band first user k and the candidate sub-band second user k', wherein the known throughput value for the candidate second user (k') during the assessment time window t, is weighted by a first weighting parameter a, and the known throughput value for the candidate first user (k) during the same assessment time window is weighted by a second weighting parameter b. The weighting parameters a and b have both respective values between 0 inclusive and 1 inclusive.

Accordingly, as described with reference to FIG. 2 there is provided a method of selecting a first sub-band user $k_1$ and a second sub-band user $k_2$, among a set of candidate sub-band users for attribution to a sub-band (s) in a multiple access communications system based on Non-Orthogonal Multiple Access (NOMA). The method may comprise the steps of:

selecting a first user ($k_1$) based on at least one criterion, calculating for each candidate pair of users comprising the selected first user ($k_1$) and a candidate second user (k) a respective first term representing the sum of the achievable throughput value for the first user k on the sub-band s when paired with the respective second candidate user k', and the achievable throughput value for the respective second candidate user k' on the sub-band s when paired with the first user k, calculating for each candidate sub-band first user k among all candidate sub-band first users and for each candidate sub-band second user k' among all candidate sub-band second users a respective second term representing the cumulated known throughput of the candidate sub-band first user k and the candidate sub-band second user k', calculated by the sum of the known throughput value for the candidate sub-band first user k during an assessment time window, and the known throughput value for the second candidate user k' during the assessment time window; and selecting a first sub-band user ($k_1$) and second sub-band user ($k_2$) wherein $k_1$ and $k_2$ form the pair of the sub-band candidate users corresponding to an extremum of the ratio between the respective first term and the respective second term.

In some embodiments where a=0, users $k_1$ and $k_2$ are selected by taking the NOMA throughput as well as the known throughput of user $k_1$ into consideration. The metric ensures balance between fairness for $k_1$ and NOMA throughput on the current sub-band s.

In some embodiments where the first user $k_1$ is selected according to a prior criterion and where a=0, the known throughput of the first user is not accounted for in the metric and the selection of user $k_2$ is only based on the maximisation of the NOMA throughput on the current sub-band s, since user $k_1$ is fixed.

In some embodiments where b=0, users $k_1$ and $k_2$ are selected by taking the NOMA throughput as well as the known throughput of user $k_2$ into consideration. The metric ensures balance between fairness for $k_2$ and NOMA throughput on the current sub-band s.

In other embodiments where (0<a≤1 and 0<b≤1), the known throughput of users $k_1$ and $k_2$ are taken into account in the denominator in various proportions.

The maximisation of this metric presented by Eq. (12) tends to favour the pair of users with a high NOMA throughput, and/or with a low known throughput and/or with a low throughput loss in NOMA as compared to an OMA configuration with user $k_1$ alone.

User selection on the basis of the foregoing metrics generally comprises identifying the user minimizing or maximizing the metric. It will be appreciated that since the metrics are presented as one factor divided by another, whether the desired user maximizes or minimizes the metric will depend on which factor is adopted as the numerator and which as the denominator. Generally, this may be referred to as identifying the user giving rise to an extremum in the ratio between the two factors.

In some embodiments, the step of selecting a first sub-band user $k_1$ may be repeated so as to select each of the candidate users as the first user in turn, and the steps of calculating the weighted FTFMM metric are also repeated before proceeding to the step of selecting the pair of candidate users.

Allocation of power to sub-bands, and amongst users within a sub-band has important implications for throughput values. In the present examples it is assumed that power is distributed equally amongst sub-bands, although there are many alternative approaches of allocation of power to sub-bands (such as water filling), and amongst users (intra-sub-band power allocation, for example Fixed Power Allocation (FPA), Fractional Transmit Power Allocation (FTPA)) within a sub-band, all of which are compatible with and encompassed in the present disclosure.

Figure 3:
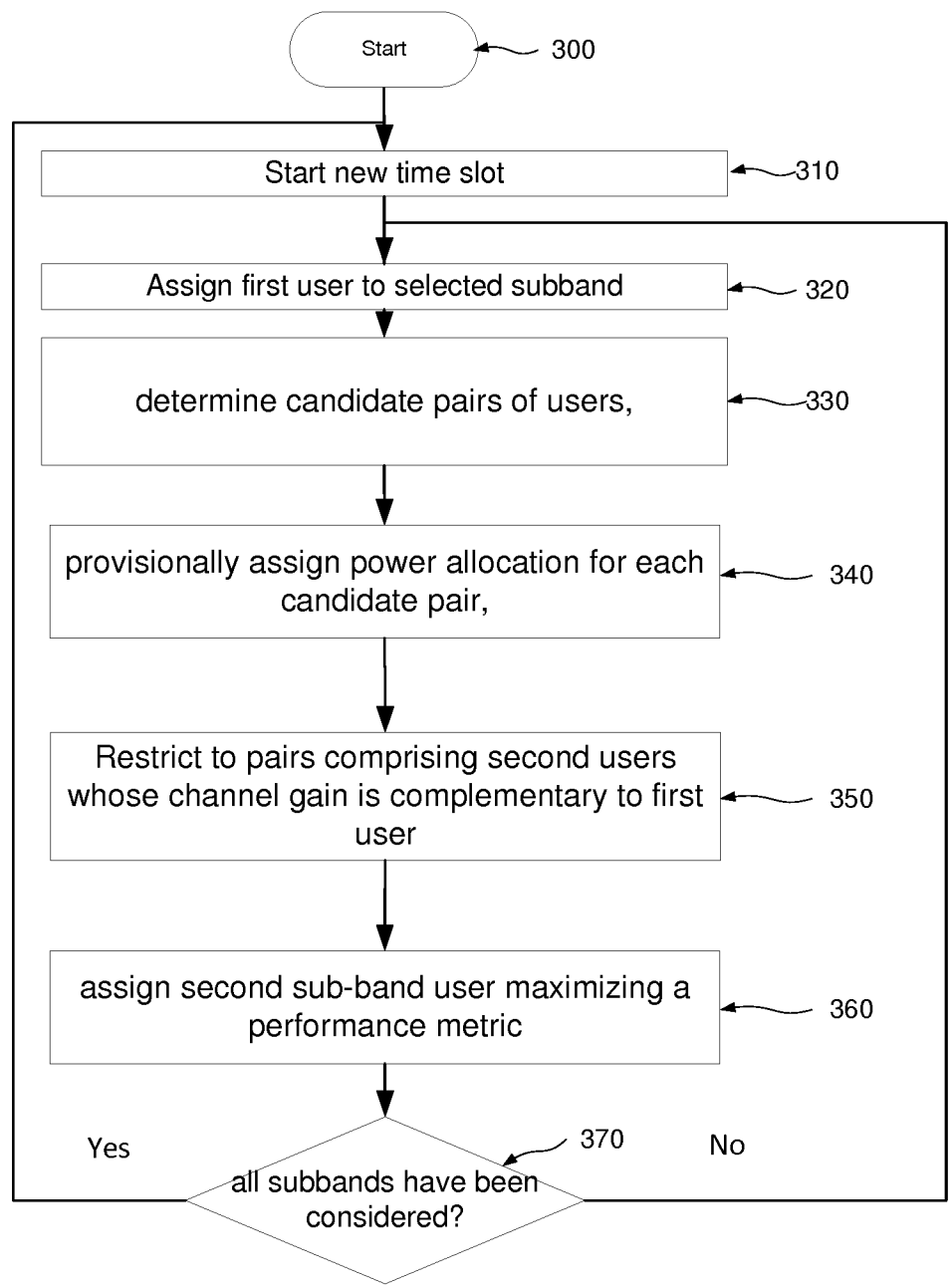
FIG. 3 displays an operating procedure of a third exemplary selection mechanism.

FIG. 3 displays an operating procedure of a third exemplary selection mechanism. In such mechanism, the invention is applied in the context of a novel selection mechanism based on a method attributing users to one or more of a plurality of S sub-bands in a multiple access communications system in accordance with a particular embodiment.

Specifically there is provided a method of selecting users from a pool of candidate users U for allocation to a plurality of sub-bands in a time slot t in a multiple access communications system.

As shown in FIG. 3, the method starts at step 300 before proceeding to step 310 at which a new time slot begins. Same as the first exemplary selection mechanism, access is granted following allocation of resources in time and frequency. Allocation is divided into a number of time slots. For each time slot, sub-bands are allocated sequentially until the total number of sub-bands per time slot is reached. This embodiment relates to an initial sub-band assignment for each user. Exemplary details of this approach are presented in more detail below.

As shown, the method next proceeds to step 320 at which a user is assigned as an initial sub-band assignment to a respective selected sub-band s in the current time slot t, as first user $k_1$ for that respective selected sub-band s. The user $k_1$ assigned at this step may be any user excluding users who have already been assigned to an initial sub-band.

The user to be assigned at this step may be selected according to a variety of bases. In certain embodiments, the method may comprise a further step of sorting all users in order of priority according to a criterion prior to the step of assigning. On this basis, at the step 320 the user assigned may be the user having the highest priority excluding any user who has already been assigned to an initial sub-band to a selected sub-band in a time slot t.

As such, a priority list may be used at the beginning of the allocation process for the selection of the $1^{st}$ user on each sub-band. The idea behind this priority list is to have all users granted a sub-band (and some throughput) at least once at the beginning of the allocation process. At the $1^{st}$ time slot, the priority list may be created: all the K users are sorted in the base station. The users are removed from this priority list as soon as they are selected in step 320 (or step 360 as described below). At subsequent time slots, if the list is not empty, only the remaining users are sorted again (update of the priority list). The resulting priority list is used while at least one user has not been assigned any sub-band during the assignment process.

In certain further embodiments, this sorting of users in order of priority may comprise sorting the users in order of best sub-band gain measured for the current time slot for each user across all sub-bands, where the user accorded the highest priority is the user having the lowest best sub-band gain. The lowest best sub-band gain sorting provides good performance notably in terms of cell-edge user throughput and total cell throughput. Users are sorted at the base station based on the sub-band gain experience by users on available sub-bands, $h_{s,k}$ being the sub-band gain of user k on sub-band s. For each user k, the best sub-band gain $h_{s_{best}}$ is the user's highest sub-band gain among the sub-band gains experienced over all sub-bands. The user with the highest priority is the one having the lowest best sub-band gain, and vice versa.

In certain further embodiments, the first user may be selected randomly. This may comprise the further step of sorting all users in order of priority according to a random sorting, which may be performed at a lower processing overhead other sorting approaches.

In the embodiment presented by FIG. 3, at step 320, the first selected user $k_1$ is assigned to the sub-band which has the highest value of $h_{s,k_1}$ among all the available sub-bands.

In embodiments assigning users from a priority list, at this stage if the priority list is not empty, the assigned user $k_1$ may be removed from the list. Accordingly, the selected sub-band to which the user is assigned as first user $k_1$ at step 320 may be selected as the sub-band to which no first user is currently attributed offering the highest channel gain for that user. Alternatively, the sub-band to which the user is assigned may be selected at random from the sub-bands to which no first user is currently assigned. This may comprise the further step of sorting all users in order of priority according to a random sorting, which may be performed at a lower processing overhead other sorting approaches.

As discussed above known throughput $R_{k,tot}(t)$ may be taken to be equal to the average throughput achieved by the user over a predefined historical period alone, or the average throughput achieved by the user over a predefined historical period corrected with the projected throughput, for the current time slot that is to say the sum of the achievable throughputs for the user on each sub-band to which the user has been attributed.

On the basis of these embodiments using a priority list, and considering that when a user is assigned to a sub-band (either as first or second user) that user is removed from the list, the selection of the first user in the initial sub-band assignment phase as discussed above may be described in terms of the priority list not being empty (all the users have not been assigned a sub-band, or, equivalently, any throughput, yet,) in which case the selection of the next user to be assigned to a sub-band as user may be carried out according to the order given by the priority list. Similarly, when the priority list is empty (all the users have now been assigned a sub-band or equivalently, a non-zero throughput) alternative selection mechanisms may be envisaged as described below.

The method next proceeds from step 320 to step 330 at which a plurality of candidate pairs of users are determined for possible assignment to the selected sub-band, where each candidate pair of users comprises two different users including the first user $k_1$ (as assigned to the sub-band at step 320) and a candidate second user k.

At step 340, a provisional power allocation is assigned to the selected sub-band for each candidate pair of users. Power may be distributed equally amongst sub-bands. However, as mentioned above, there are many alternative approaches of allocation of power to sub-bands (such as waterfilling), and amongst users (intra-sub-band power allocation such as FPA or FTPA) within a sub-band, all of which are compatible with and encompassed in the present disclosure.

Similarly, the total available transmission power may be distributed between sub-bands by a variety of mechanisms. One example is based on an equal distribution of power. Alternatively, according to certain alternative embodiments, provisional power allocation may be carried out during the pairing process. This provides an opportunity to attempt to identify an optimal power distribution between the users. The achievable throughputs for users $k_1$ and $k_2$ are functions of the power allocated to each user.

On the basis of equally distributing power amongst sub-bands, Pmax/S is assigned to a first sub-band and no further inter-sub-band calculation is required for this sub-band. In successive iterations, the inter-sub-band power allocation for the $n^{th}$ sub-band assigned in the time slot (n>1) n×Pmax/S is provisionally assigned across the n first sub-bands. In these later iterations, where there are more than one sub-bands to consider, this power is redistributed among all the n sub-bands using the iterative waterfilling procedure as described in more detail below.

At step 350, the plurality of candidates is restricted to a set of candidate pairs comprising candidate second users whose sub-band gain is complementary to the sub-band gain of the first user. A complementary sub-band gain is a sub-band gain such that assigning a user having that sub-band gain to the selected sub-band together with the corresponding first user would indicate a total sub-band throughput greater than the sub-band throughput achievable by assigning all available power as indicated by the provisional power allocation for the corresponding candidate pair of users ($k_1$, k) for the respective sub-band to the first user $k_1$.

In certain embodiments, a complementary second user may be a candidate second user which exhibits a large difference in sub-band gain with respect to the first user $k_1$, taking advantage of the fact that the total throughput in NOMA systems increases with the difference in sub-band gains of paired users.

Different mechanisms for identifying such complementary users may be envisaged. In a first, "brute force" implementation, the sub-band gain values may be computed for all the candidate users $k \in S_2$ (excluding the already selected first user $k_1$) for the sub-band s for which the second respective user is to be assigned, and for every candidate second user k, computing the achievable throughput for $k_1$ and k on s.

In certain embodiments, the achievable throughput for $k_1$ and k depends on the intra-sub-band and inter-sub-band power allocation strategy. On this basis, only the subset $S_2$ of users k need be retained such that the cumulated achievable throughput of $k_1$ and k on sub-band s is greater than the throughput of $k_1$ alone (that is, the OMA situation). If no user k can satisfy this condition ($S_2=\emptyset$), the method may simply adopt OMA, where user $k_1$ occupies the currently selected sub-band s.

The method of FIG. 3 next proceeds from step 350 to step 360 at which a respective second sub-band user $k_2$ is assigned (as an initial sub-band assignment) to the user excluding any user who has already been assigned to an initial sub-band, belonging to the set corresponding to an extremum in the ratio between a first term reflecting the total throughput achievable by any pair of users assigned to the sub-band (s) under consideration, and a second term reflecting the known throughput achieved by that same pair of users over a predetermined preceding period.

Now that a set of complementary pairs of candidate users is available, the method of FIG. 3 may proceed to select one of these candidate pairs of users for the definitive attribution of a selected second candidate user $k_2$ to the selected sub-band. At step 360 the second sub-band user $k_2$ may be selected as the candidate second user k maximizing a metric reflecting the system throughput, subject to a factor reflecting fairness across users.

In accordance with the FTFMM metric, a second user $k_2$ is selected that maximizes the metric presented by Eq. (6) tending to favour the pair of users with a high NOMA throughput and/or with a low known throughput. In particular embodiments, a variant of the FTFMM metric may be used where optional factors a and b are applied as presented in Eq. (12) to provide a mechanism for varying the relative importance of fairness on one hand and throughput on the other hand.

As such, the third exemplary selection mechanism displayed in FIG. 3 is one example of a FTFMM metric suitable for use in the selection of the second user $k_2$ for a particular sub-band s, wherein the second sub-band user $k_2$ is selected as the candidate second user giving rise to an extremum in a metric reflecting the ratio between total throughput achievable by each pair of users comprising the first user $k_1$ assigned to the sub-band under consideration s and a respective candidate second user, and the known throughput achieved by that same pair of users over a predetermined preceding period.

As shown in FIG. 3 the method next determines at step 370 whether all S sub-bands have been considered and in a case where sub-bands remain to be considered, reverting to step 320, or otherwise reverting to step 310. On this basis the method may be considered to comprise the further steps of then repeating the steps of assigning a first user $k_1$ to a selected sub-band s, provisionally assigning a power allocation to the selected sub-band s, and assigning a second user $k_2$ to the selected sub-band s, until all S sub-bands in the current time slot have been attributed.

In some embodiments, a variant of the FTFMM may be applied, wherein the selected second user $k_2$ is the candidate second user that minimizes the following metric:

$$k_2 = \underset{k \in S_2}{\text{Argmax}} \frac{\sum_{k'=1}^{K} |R_{k',tot}(t) - AVG(t)|}{R_{s,k_1}(t) + R_{s,k}(t)} \quad \text{Eq. (13)}$$

Where
The set of candidate second users is noted $S_2$.
K is the total number of users
$R_{s,k}(t)$ (and respectively $R_{s,k_1}(t)$) is the achievable throughput for a candidate second user k) (respectively the selected first user $k_1$) on sub-band s, when paired with $k_1$ (respectively with k).
$R_{k',tot}(t)$ is the known throughput of user k' in a past window of length $t_c$, as expressed in Eq. 7, or which may in some embodiments additionally take account of the projected throughput for user k' at time t as expressed by Eq. (8).
When applying this FTFMM variant (Eq. (13)) at step 260 of the exemplary embodiment presented by FIG. 2, If user k' has not been assigned any sub-band in the current allocation time slot t, then the ratio $R_{k'}(t)/t_c$ is equal to zero.

$$AVG(t) = \frac{1}{K} \sum_{k'=1}^{K} R_{k',tot}(t)$$

is the average value of $R_{k,tot}(t)$ computed over all the users.
The FTFMM variant metric expressed by Eq. (13) may be used at step 360 of the exemplary embodiment presented by FIG. 3.

The minimization metric expressed by Eq. (13) tends to favour users $k_2$ that make the known throughput of every user as close to the average throughput of all users (which in a case where any user may be attributed to the sub band, corresponds to all candidate users) and/or with a high NOMA throughput, offering a balance between fairness and throughput.

In some embodiments, the step of selecting a first sub-band user $k_1$ may be repeated so as to select each of the candidate users as the first user in turn, and the steps of calculating the FTFMM variant expressed by Eq. (13) are also repeated before proceeding to the step of selecting the pair of candidate users.

As such the FTFMM variant metric expressed by Eq. (13) may represent a combination of aspects of the FTFMM metric presented in Eq. (6) and another metric that may be named "Fairness Maximisation Metric" (FMM). In such FMM metric, the user $k_2$ that minimizes the following metric is selected:

$$k_2 = \underset{k \in S_2}{\mathrm{Argmax}} \frac{\sum_{k'=1}^{K} |R_{k',tot}(t) - AVG(t)|}{AVG(t)} \quad \text{Eq. (14)}$$

The minimization of the FMM metric expressed by Eq. (14) tends to favour user $k_2$ that makes the known throughput of every user as close as possible to the average throughput of all users. Perfect fairness is obtained when the metric is equal to zero.

The FMM metric may be suitable for use in the selection of a second user for a particular sub-band, wherein the second sub-band user is selected as the candidate second user giving rise to an extremum in the matching between the known throughput of each user and the average throughput of all users over a predetermined preceding period.

In Eq. (14), the candidate second user under consideration k does not explicitly appear in the expressions of the numerator or of the denominator but it actually has an impact on the values of the known throughput values $R_{k',tot}(t)$ and on AVG(t) via the projected throughputs, $R_k(t)$.

In some embodiments of the FMM metric (Eq. (11)), and thus some embodiments of the FTFMM variant metric (Eq. (10)), in case of equal power allocation: only the known throughput values of the candidate second user under consideration k and of the selected first user $k_1$, $R_{k,tot}(t)$ and $R_{k_1,tot}(t)$, depend on the choice of user k.

In some embodiments of the FMM metric (Eq. (11)), and thus some embodiments of the FTFMM variant metric (Eq. (10)), in case of iterative water filling: the choice of user k has an impact on $R_{k,tot}(t)$ and $R_{k_1,tot}(t)$ and also on all values of $R_{k',tot}(t)$ for the users k' already allocated in current time slot t.

The computation of the FTFMM variant metric requires power allocation, provisional or final, depending on the power allocation strategy.

As such, the FTFMM variant metric expressed by Eq. (10) is one example of a metric suitable for use in the selection of the second user $k_2$ for a particular sub-band s, wherein the second sub-band user $k_2$ is selected as the candidate second user giving rise to an extremum in a metric reflecting a ratio between the total throughput achievable by each pair of users comprising the first user $k_1$ assigned to the sub-band s under consideration and a respective candidate second user, and the sum of deviations of the known throughput of each user over a predetermined preceding period $t_c$ from the average throughput of all users over the predetermined preceding period $t_c$.

Experimental Results

It has been shown experimentally that implementations of the method of FIG. 3 adopting the FTFMM metric with the a weighting factor set to 0 and the b weighting factor set to 1 provides a dramatic improvement (around 40%) in throughput for all numbers of sub-bands, while adopting the FTFMM metric with the a weighting factor set to 0.5 and the b weighting factor set to 0.5, or the a weighting factor set to 1 and the b weighting factor set to 0 offer some improvement (around 10%) whilst the FMM metric provides minimal improvements compared to conventional proportional fairness. The general distributions are the same when considering throughput for different numbers of users, although performance differences are limited with small numbers of users (10 in the experiments), they grow very quickly when adopting the FTFMM metric with the a weighting factor set to 0 and the b weighting factor set to 1 for larger user counts.

Figure 4:
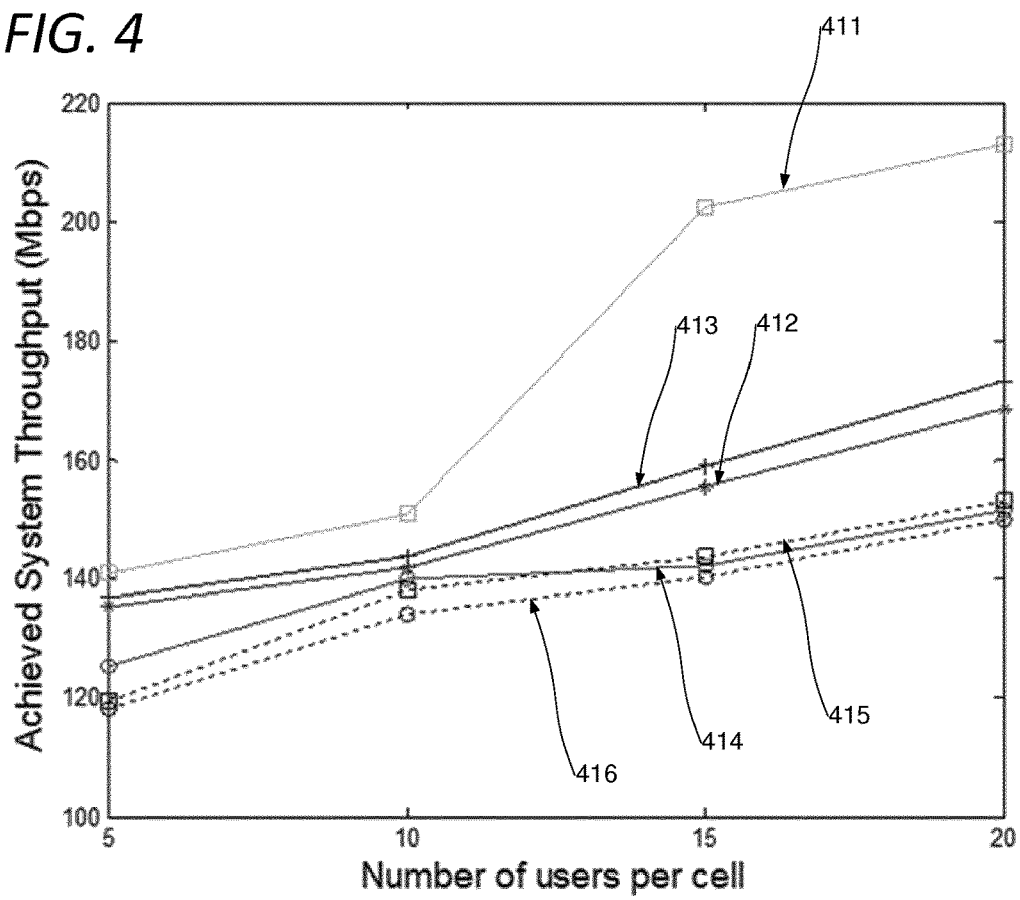
FIG. 4 displays the impact of parameters a and b of FTFMM metric and the number of users per sub-band on the total cell throughput in one set of exemplary experimental data.

FIG. 4 displays the impact of parameters a and b of FTFMM metric and the number of users per sub-band on the total cell throughput in one set of exemplary experimental data. FIG. 4 compares the performance of FTFMM metric (411), (412), (413) with FMM metric (414), classical PF used with NOMA (415) and classical PF used with Orthogonal Multiple Access (OMA) (416), in terms of the evolution of total cell throughput as a function of the number of users per sub-band K where the number of sub-bands S is equal to 128.

As shown in FIG. 4 an implementation of the method of FIG. 3 adopting the FTFMM metric with the a weighting factor set to 0 and the b weighting factor set to 1 (411) may provide a dramatic improvement (around 40%) in throughput for all numbers of users, while adopting the FTFMM metric with the a weighting factor set to 0.5 and the b weighting factor set to 0.5, (413) or the a weighting factor set to 1 and the b weighting factor set to 0 (412) offer some improvement (around 10%) whilst the FMM metric (414) provides minimal improvements compared to conventional proportional fairness. The same general distributions are the same when considering throughput for different numbers of users, although performance differences are limited with small numbers of users (10 in the experiments), they grow very quickly when adopting the FTFMM metric with the a weighting factor set to 0 and the b weighting factor set to 1 for larger user counts.

Figure 5:
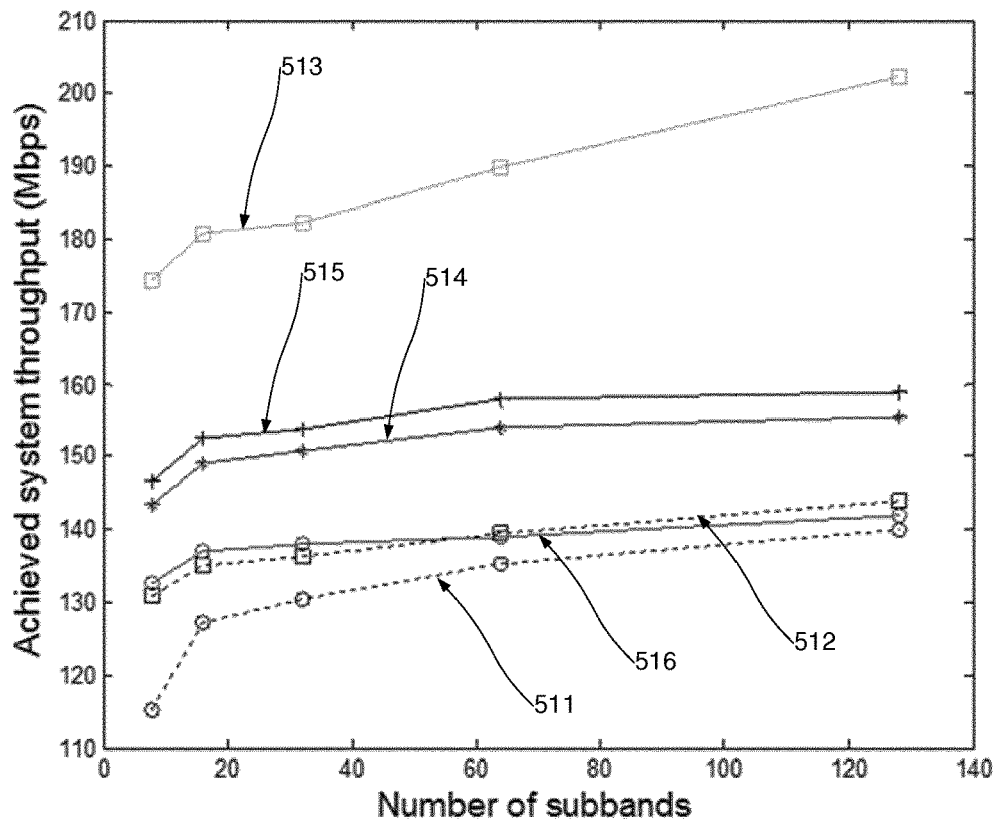
FIG. 5 displays the impact of parameters a and b of FTFMM metric and the number of sub-bands on the total cell throughput.

FIG. 5 displays the impact of parameters a and b of FTFMM metric and the number of sub-bands on the total cell throughput. FIG. 5 compares the performance of FTFMM (513), (514), (515) metric with FMM (516), classical PF used with NOMA (512) and classical PF used with OMA (511) in terms of the evolution of total cell throughput as a function of the number of sub-bands S where the number of users per sub-band K is equal to 15.

As shown in FIG. 5 an implementation of the method of FIG. 3 adopting the FTFMM metric with the a weighting factor set to 0 and the b weighting factor set to 1 (513) may provide a dramatic improvement (around 40%) in throughput for all numbers of sub-bands, while adopting the FTFMM metric with the a weighting factor set to 0.5 and the b weighting factor set to 0.5, (515) or the a weighting factor set to 1 and the b weighting factor set to 0 (514) offer some improvement (around 10%) whilst the FMM metric (516) provides minimal improvements compared to conventional proportional fairness. The same general distributions are the same when considering throughput for different numbers of sub bands.

Figure 6:
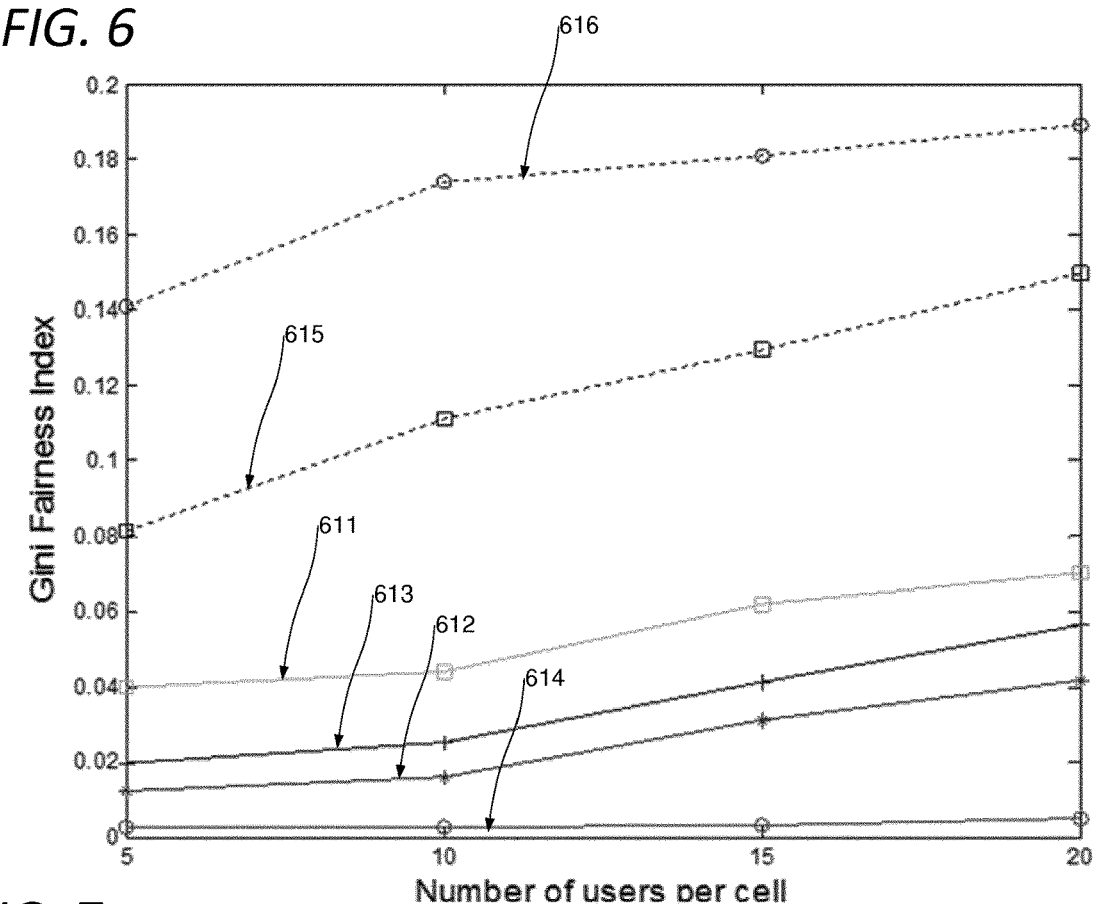
FIG. 6 displays the impact of parameters a and b of FTFMM metric and the number of users per sub-band on fairness.

FIG. 6 displays the impact of parameters a and b of FTFMM metric and the number of users per sub-band on fairness. The presented curves correspond to an embodiment where the number of sub-bands S=128. Three curves 611, 612 and 613 are presented for FTFMM with different balances between a and b. For comparison purposes, experimental results for FMM 614, classical PF used with NOMA 615 and classical PF used with OMA 616 metrics are also presented. It has been shown experimentally that implementations of the method of FIG. 3 adopting the FTFMM metric with the a weighting factor set to 0 and the b weighting factor set to 1 (curve 611) provides poorer fairness performance than adopting the FTFMM metric with the a weighting factor set to 0.5 and the b weighting factor set to 0.5 (curve 613), which in turn provides poorer performance than adopting the FTFMM metric with the a weighting factor set to 1 and the b weighting factor set to 0 (curve 612), whilst the FMM metric provides improved performance. All implementations provide significant improvements compared to conventional proportional fairness. All approaches show similar rates of degradation from additional users per cell.

Figure 7:
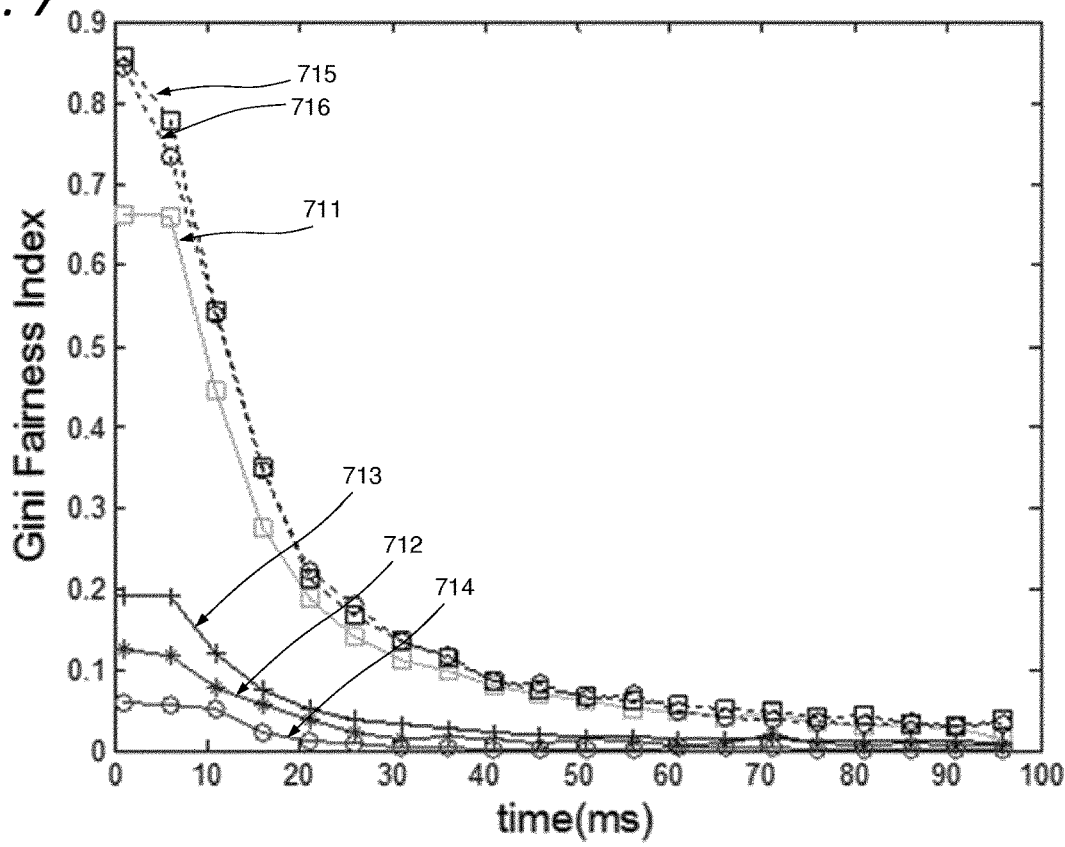
FIG. 7 displays the impact of parameters a and b of FTFMM metric on fairness over time. The presented curves correspond to an embodiment where the number of sub-bands S=128 and the number of users par sub-band K=15. Three curves 711, 712 and 713 are presented for FTFMM with different balances between a and b. For comparison purposes, experimental results for FMM 714, classical PF used with NOMA 715 and classical PF used with OMA metrics 716 are also presented.

FIG. 7 displays the impact of parameters a and b of FTFMM metric on fairness over time. The presented curves correspond to an embodiment where the number of sub-bands S=128 and the number of users par sub-band K=15. Three curves 711, 712 and 713 are presented for FTFMM with different balances between a and b. For comparison purposes, experimental results for FMM 714, classical PF used with NOMA 715 and classical PF used with OMA metrics 716 are also presented.

It has been shown experimentally that implementations of the method of FIG. 3 adopting the FTFMM metric with the a weighting factor set to 1 and the b weighting factor set to 0 (curve 712) converges on optimal fairness more quickly than adopting the FTFMM metric with the a weighting factor set to 0.5 and the b weighting factor set to 0.5 (curve 713), which in turn converge on optimal fairness more quickly than adopting the FTFMM metric with the a weighting factor set to 0 and the b weighting factor set to 1 (curve 711), whilst the FMM metric provides the fastest convergence on optimal fairness (curve 714). All implementations provide significant improvements compared to conventional proportional fairness in NOMA (reaching a Gini fairness of 0.1 in less than 10 ms or less) apart from the FTFMM metric with the a weighting factor set to 0 and the b weighting factor set to 1, which shows a relatively small improvement. The FTFMM metric with the a weighting factor set to 1 and the b weighting factor set to 0 (curve 712), and the FMM metric (curve 714) show a far smoother, less bursty user throughput level over time.

Naturally the values obtained in different configurations will vary on the basis of system configuration and other experimental conditions, but the trends detected confirm the expected behaviour of the different implementations.

Accordingly, there is provided a method of determining a performance metric for a selection of a first user and a second user among a set of candidate users for attribution to a sub-band in a multiple access communications system based on Non-Orthogonal Multiple Access (NOMA), is provided wherein the first user ($k_1$) and the second user ($k_2$) are selected as the pair of candidate users corresponding to an extremum of the ratio between a first term reflecting the total throughput achievable by any pair of candidate users assigned to the sub-band (s) under consideration, and a second term reflecting the known throughput achieved by that same pair of candidate users over a predetermined preceding period. Implementations include a method of determining a performance metric is presented for attributing users to one or more of a plurality of sub-bands in a multiple access communications system, in which in an initial assignment phase for a specific sub-band, a first user is selected for that band on the basis of one or more criteria such as user priority. Then a second sub-band user maximizing or minimizing the performance metric.

Figure 8:
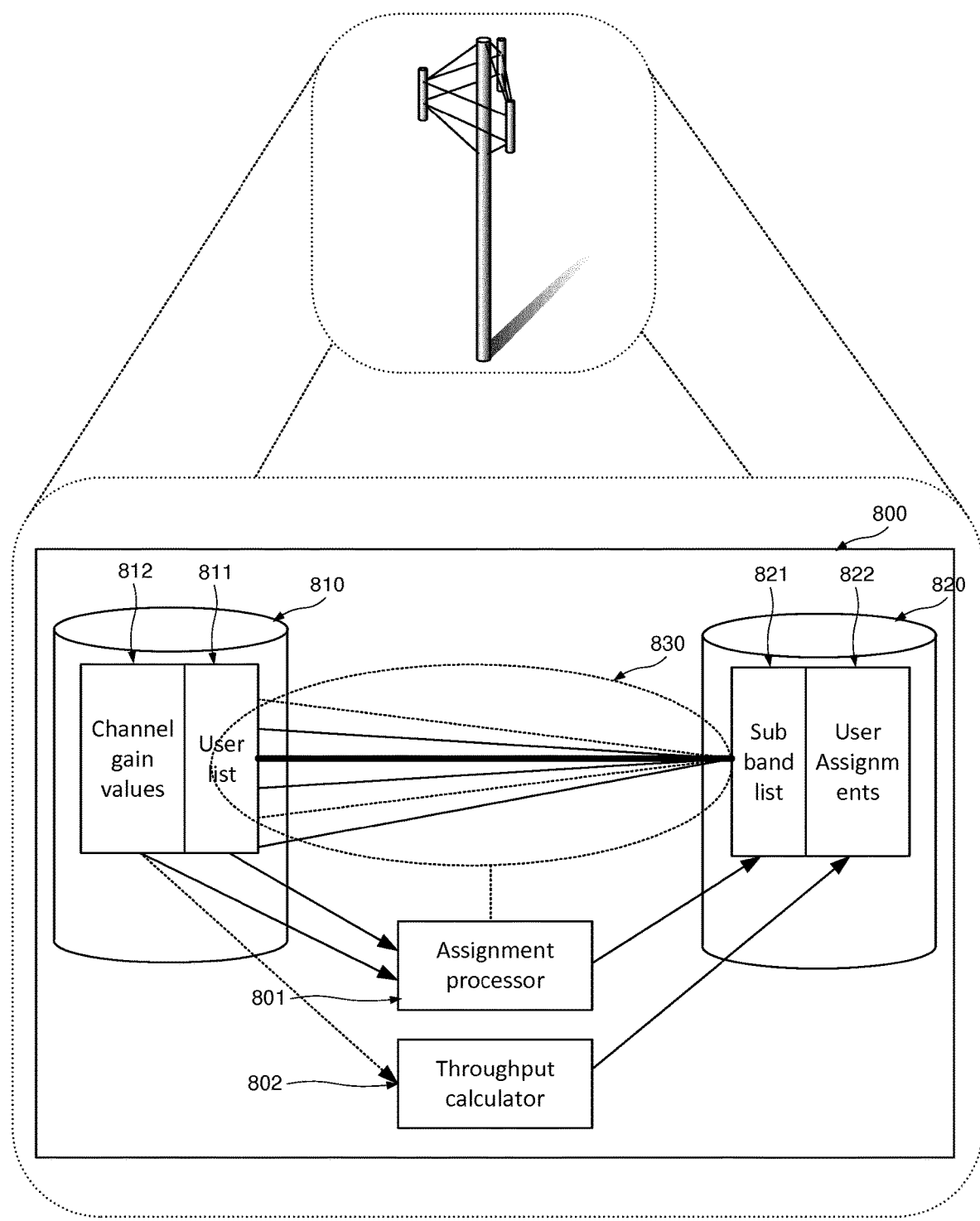
FIG. 8 shows a system according to an embodiment.

FIG. 8 shows a system according to an embodiment. As shown, there is provided a system 800 for attributing users to one or more of a plurality of sub-bands in a multiple access communications system.

As shown, the system comprises a first data structure 810 presenting a user list 811.

The system 800 further comprises an Assignment processor 801 adapted to compile pairs of users for processing by the power calculator, for example as discussed with reference to the embodiments of any of FIG. 1, 2 or 3.

As such, the assignment processor 801 may access the user list 811 to obtain priority information to select the first user, and also access a second data structure 820 presenting a sub-band list 821, to register assignments in an associated sub-band assignments space 822.

The system 800 further comprises a throughput calculator 802 adapted to determine for the respective selected sub-band a plurality of candidate pairs of users for possible assignment to the selected sub-band, each candidate pair of users comprising two different users including the first user and a candidate second user, and to determine the pair of candidate users maximizing a metric reflecting the total throughput achievable by any pair of users assigned to the sub-band (s) under consideration, as a proportion of the known throughput achieved by that same pair of users over a predetermined preceding period.

The Assignment processor 801 can then assign the pair of candidate users maximizing the metric to the sub-band (s) under consideration.

As such, the throughput calculator 802 accesses the second data structure 820 to register power assignments to each candidate pair of users as stored in the selected sub-band assignments space 822. In some embodiments, depending on the approach adopted for the determination of intra sub-band power assignments, the power calculator may also access user list 811 to obtain channel gain values associated with respective users in an associated user channel gain space 812.

The assignment processor 801 may further be adapted to restrict the plurality of candidate pairs to a set of candidate pairs comprising candidate second users whose channel gain is complementary to the channel gain of the first user, and to assign the respective second sub-band user as an initial sub-band assignment to the user excluding any user who has already been assigned to an initial sub-band, belonging to the set maximizing a performance metric reflecting the achieved throughput, and/or fairness across users. As such, the assignment processor 801 may access the second data structure 820 to cancel candidate pair designations relating to non-complementary combinations of users. FIG. 8 represents the candidate pair groupings by the lines 830. As shown, the first user is linked with a bold line. Candidate second users are represented by other lines, so that each candidate pair comprises the bold line and any other line. Dotted lines represent candidate second users that are not complementary with the first user, and are thus excluded by the operation of the assignment processor.

The system 800 is adapted to iteratively process users for each sub-band, until all sub-bands in the current time slot have been attributed. By the same token, the system 800 may sequentially process subsequent time slots. By way of example, the system of FIG. 8 is represented as being associated with a cellular telephone tower, e.g. a base transceiving station. The skilled person will appreciate that equivalent functionality might equally be implemented in a communications device such as a telephone hand set, or in other parts of the communications network such as a Base station controller, mobile switching center, and so on.

It will be appreciated that alternative functional groupings may be envisaged, implementing equivalent operations.

While the present invention has been described generally in the context of radio communications such as cellular radio communications, it will be appreciated that embodiments are applicable to many other contexts in which NOMA type communication may be envisaged. For example, embodiments may be employed in a Light Fidelity (Li-Fi) transmitter in the field of visible light communication. A Li-Fi transmitter may control or comprise a group of light-emitting diodes (LED) or optical sensors or photo-detectors connected or included in connected objects such as computer, phone, clock, home or office appliances, etc. In such embodiments, the invention is applied in multi-access communication systems for indoor access networks which make part of Local Area Networks (LAN).

Similarly, embodiments may be used in Radio over free space optical communication systems, for example controlling the transmission of data by the modulation of laser output.

Embodiments of FTFMM metrics are given above for user allocation to sub-bands in multiple access communications systems. However, the skilled person will appreciate that the invention approaches may be adapted to remove a user from a multi-user sub-band based on an opposite extremum of one of the FTFMM metrics presented above, in a way that, for example, minimizing sub-band interferences or stopping a communication.

It will be appreciated that the system of FIG. 8 or any equivalent functional grouping may further be adapted to implement the functions corresponding to any combination of the method steps described above with reference to any of FIGS. 1 to 3.

The disclosed methods and/or functional groupings can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

These methods and processes may be implemented by means of computer-application programs or services, an application-programming interface (API), a library, and/or other computer-program product, or any combination of such entities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for attributing users to one or more of a plurality of sub-bands in a multiple access communications system based on Non-Orthogonal Multiple Access (NOMA), the system comprising:
an assignment processor adapted to determine for a respective selected sub-band a plurality of candidate pairs of users for possible assignment to the selected sub-band, each candidate pair of users comprising two different users including a first user and a candidate second user;
and a throughput calculator adapted to calculate for each candidate pair of users comprising the first user ($k_i$) and a respective candidate second user (Kk), a respective first term representing the sum of the achievable throughput value for the selected first user ($k_i$) on the sub-band (s) when paired with the respective candidate user (Kk), and the achievable throughput value for the respective candidate user (k) on the sub-band (s) when paired with the selected first user ($k_i$), to determine the pair of candidate users corresponding to an extremum of the ratio between a first term reflecting the total throughput achievable by any pair of candidate users assigned to the sub-band (s) under consideration, and a second term reflecting the known throughput achieved by that same pair of candidate users over a predetermined preceding period,
the assignment processor being further adapted to assign the pair of candidate users determined by the throughput calculator to maximize the metric to the sub-band (s) under consideration.

2. A method of determining a performance metric for a selection of a first user ($k_i$) and a second user (kz) among a set of candidate users for attribution to a sub-band (s) in a multiple access communications system based on Non-Orthogonal Multiple Access (NOMA), comprising:
calculating for each candidate pair of users comprising the first user ($k_i$) and a respective candidate second user (Kk), a respective first term representing the sum of the achievable throughput value for the selected first user ($k_i$) on the sub-band (s) when paired with the respective candidate user (Kk), and the achievable throughput value for the respective candidate user (k) on the sub-band (s) when paired with the selected first user ($k_i$), and
wherein the first user ($k_i$) and the second user (k2) are selected as the pair of candidate users corresponding to an extremum of the ratio between a first term reflecting the total throughput achievable by any pair of candidate users assigned to the sub-band (s) under consideration, and a second term reflecting the known throughput achieved by that same pair of candidate users over a predetermined preceding period.

3. The method of claim 2, comprising the steps of: selecting a first user ($k_i$) based on at least one criterion, calculating for each candidate user (k) among all candidate sub-band users excluding the selected first user ($k_i$) a respective second term representing the cumulated known throughput of the selected first user ($k_i$) and the candidate user (k), calculated by the sum of the known throughput value for the selected first user ($K_i$) across all sub-bands during an assessment time window, and the known throughput value for the second candidate user (k) across all sub-bands during the assessment time window, selecting a second user (kz), wherein the selected first user ($k_i$) and the selected second user (kz) form the pair of candidate users corresponding to an extremum of the ratio between the respective first term and the respective second term.

4. The method of claim 3, wherein the step of calculating for each candidate sub-band user (kK) among all candidate sub-band users excluding the selected first sub-band user (k,) a respective second term comprises: calculating for each user (') the known throughput of the user (k') during the assessment time window taking account of the projected throughput for user (k') at the time of the step of calculating a respective second term, calculating the average value of the known throughput computed over all candidate sub-band users, the respective second term being the sum over each user (k') among all candidate sub-band users of the absolute value of the difference between the known throughput of the user (k') taking account of the projected throughput for user (k') and the average value of the known throughput computed over all candidate sub-band users.

5. The method of claim 2, comprising the further step of repeating the step of selecting a first user (K,) so as to select each of the candidate users as the first user in turn, and repeating the steps of calculating the first term and calculating the second term for each candidate user (kK) of the set of candidate users excluding the selected first user (k,), before proceeding to the step of selecting the pair of candidate users.

6. The method of claim 2, comprising the further step of attributing the sub-band (s) to the selected first user (k,) paired with the selected second user (Kk).

7. The method of claim 4, wherein the second term represents a weighted cumulated known throughput of the candidate second user (k) and the selected first user (K,), wherein the know throughput value for the second candidate user (Kk) across all sub-bands during the assessment time window is weighted by a first weighting parameter (a), and the known throughput value for the selected first user (k,) across all sub-bands during the assessment time window is weighted by a second weighting parameter (b), the first weighting parameter (a) and the second weighting parameter (b) having respective values between 0 inclusive and 1 inclusive.

8. The method of claim 7, wherein the value of the first weighting parameter (a) is set to 0, thereby maximizing the NOMA throughput on the sub-band (s).

9. The method of claim 7, wherein the value of the second weighting parameter (b) is set to 0, thereby achieving a balance between fairness for the selected second sub-band user (kz) and NOMA throughput on the sub-band (s).

10. The method of claim 7, wherein the value of the first weighting parameter (a) and the value of the second weighting parameter (b) are both not null, thereby reducing the impact of the known throughput of the second user (k2).

11. The method of claim 2, wherein the known throughput of a user (k) takes account of a projected throughput for the user (k) and the average throughput during the assessment time window, wherein the projected throughput is the sum of the achievable throughputs for the user (k) on each sub-band to which the user (k) has been attributed in a current time slot.

12. A non-transitory computer readable medium comprising a computer program comprising instructions which, when the program is executed by a computer, cause the computer to carry out the method of claim 2.

\* \* \* \* \*